(12) United States Patent
Hoyt et al.

(10) Patent No.: US 7,897,267 B2
(45) Date of Patent: Mar. 1, 2011

(54) APPARATUS AND METHODS OF IMPROVING RISER WELD FATIGUE

(75) Inventors: Douglas S. Hoyt, The Woodlands, TX (US); Michael S. Weir, The Woodlands, TX (US); Wan C. Kan, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 599 days.

(21) Appl. No.: 11/886,603

(22) PCT Filed: Apr. 10, 2006

(86) PCT No.: PCT/US2006/013303
§ 371 (c)(1),
(2), (4) Date: Sep. 18, 2007

(87) PCT Pub. No.: WO2006/115754
PCT Pub. Date: Nov. 2, 2006

(65) Prior Publication Data
US 2009/0169912 A1   Jul. 2, 2009

Related U.S. Application Data

(60) Provisional application No. 60/675,055, filed on Apr. 26, 2005.

(51) Int. Cl.
*F16L 13/02* (2006.01)
*B23K 35/22* (2006.01)
*B32B 1/08* (2006.01)

(52) U.S. Cl. .................. 428/679; 285/288.1; 285/329; 285/422; 166/367; 219/61; 138/142

(58) Field of Classification Search .................. None
See application file for complete search history.

(56) References Cited

U.S. PATENT DOCUMENTS

| | | | |
|---|---|---|---|
| 4,049,186 A | 9/1977 | Hannenman et al. | |
| 4,211,503 A | 7/1980 | Peterson et al. | |
| 4,490,186 A * | 12/1984 | Sines et al. | 148/527 |
| 4,619,557 A | 10/1986 | Salama et al. | |
| 4,701,055 A | 10/1987 | Anderson | |
| 4,702,406 A | 10/1987 | Sullivan et al. | |
| 5,233,149 A | 8/1993 | Killian et al. | |
| 5,258,600 A | 11/1993 | Arthur | |
| 5,347,098 A | 9/1994 | Murakami et al. | |
| 5,569,396 A | 10/1996 | Topolski | |
| 5,794,982 A | 8/1998 | Green et al. | |

(Continued)

FOREIGN PATENT DOCUMENTS
EP   0 523 615 A2   7/1992

(Continued)

OTHER PUBLICATIONS

Machine translation of FR 2799401. Apr. 13, 2001.*

(Continued)

*Primary Examiner* — John J Zimmerman

(57) ABSTRACT

A tubular assembly comprising a first iron based tubular having a first non-cladded inner surface; and a second iron based tubular having a second non-cladded inner surface, wherein the first tubular is connected to the second tubular using a non-iron based bonding material. Preferably, the non-iron based bonding material has a lower crack growth rate than the iron based tubulars.

12 Claims, 3 Drawing Sheets

U.S. PATENT DOCUMENTS

| | | | |
|---|---|---|---|
| 5,855,699 A * | 1/1999 | Oyama et al. | 148/519 |
| 5,897,801 A | 4/1999 | Smashey et al. | |
| 6,193,145 B1 * | 2/2001 | Fournier et al. | 228/262.41 |
| 6,337,459 B1 * | 1/2002 | Terwijn et al. | 219/121.47 |
| 6,338,765 B1 | 1/2002 | Statnikov | |
| 6,403,235 B1 | 6/2002 | Glidden et al. | |
| 6,447,716 B1 * | 9/2002 | Cozar et al. | 420/445 |
| 6,596,971 B1 | 7/2003 | Biskup et al. | |
| 7,562,807 B2 * | 7/2009 | Coleman et al. | 228/262.41 |
| 2003/0106685 A1 | 6/2003 | Salama et al. | |
| 2003/0107186 A1 | 6/2003 | Salama et al. | |
| 2005/0166987 A1 | 8/2005 | Matsubara et al. | |
| 2005/0247763 A1 * | 11/2005 | Coleman et al. | 228/262.41 |

FOREIGN PATENT DOCUMENTS

| | | |
|---|---|---|
| EP | 1 186 368 | 8/2001 |
| FR | 2 327 022 | 5/1977 |
| FR | 2 799 401 | 4/2001 |
| JP | 55 042148 | 3/1980 |
| JP | 56 160882 | 10/1981 |
| JP | 05 293661 | 9/1993 |
| JP | 6-031453 * | 2/1994 |
| JP | 08 141740 | 4/1996 |
| JP | 2002 001539 | 1/2002 |
| JP | 2004-276035 * | 10/2004 |
| WO | WO 94/29565 | 11/1994 |
| WO | WO 00/63598 | 11/2000 |
| WO | WO 03/033856 | 4/2003 |

OTHER PUBLICATIONS

European Patent search report relating to 2005UR011 dated Jan. 24, 2006. 29 pages.

PCT International Search Report. PCT/US06/13303 Dated Nov. 8, 2006. 3 pages.

* cited by examiner

APPARATUS AND METHODS OF IMPROVING RISER WELD FATIGUE

CROSS REFERENCE TO RELATED APPLICATIONS

This application claims the benefit of U.S. Provisional Application No. 60/675,055, filed 26 Apr. 2005.

BACKGROUND

1. Field of Inventions

Embodiments of the present inventions relate to apparatus and methods of forming a riser. Particularly, embodiments of the present invention relate to apparatus and methods of improving fatigue performance of a riser weld.

2. Description of Related Art

Risers are used in deepwater projects to convey fluids from pipelines on the seabed to floating or fixed facilities on the surface. In one riser configuration, the steel catenary riser (SCR) is composed of a number of pipe joints connected together by girth welds. The term catenary describes the shape the riser takes when it is suspended from a platform or floating production vessel (hang-off point), and extends to the ocean floor (touchdown point). Steel catenary risers are subjected to hydrodynamic loads during their service life, and the fatigue performance of the entire riser will rely on the fatigue strength of the welds. Accordingly, improvement of fatigue performance of the riser girth welds will improve the fatigue performance of the entire riser.

SUMMARY

In one embodiment, a tubular assembly is provided, comprising (including) a first tubular having a first inner surface; a second tubular having a second inner surface; and a metallic bond connecting the first tubular to the second tubular, wherein the metallic bond comprises a material that has a lower crack growth rate than at least that of the first tubular and the second tubular. In another embodiment, the tubular assembly further comprises metallic cladding disposed on each of the first inner surface and the second inner surface.

In another embodiment, a tubular assembly is provided, comprising a first iron based tubular having a first non-cladded inner surface; and a second iron based tubular having a second non-cladded inner surface, wherein the first tubular is connected to the second tubular using a non-iron based bonding material.

In yet another embodiment, a tubular assembly is provided, comprising a first tubular; a second tubular; a metallic bond connecting the first tubular to the second tubular; and a metallic cladding disposed on a bonding surface of the first tubular and the second tubular, wherein the bonding surface is substantially smooth.

In yet another embodiment, a method of connecting a first tubular to a second tubular is provided, comprising bonding an end of the first tubular to an end of the second tubular; and disposing a metallic cladding on a bonding surface of at least one of the first tubular and the second tubular; wherein the bonding surface is substantially smooth.

In yet another embodiment, a riser assembly is provided, comprising a riser assembly comprising a first riser joint having a first inner surface and a second riser having a second inner surface. A non-iron based weld material is used to connect the first tubular to the second tubular, and a non-iron based cladding is disposed on each of the first inner surface and the second inner surface, wherein the cladding extends along a length of the first tubular and the second tubular and wherein each of the non-iron based weld material and the non-iron based cladding has a lower crack growth rate than the first tubular.

In one embodiment, a tubular assembly is provided, comprising (including) a first tubular having a first inner surface; a second tubular having a second inner surface; a metallic bond connecting the first tubular to the second tubular; and a metallic cladding disposed on the first inner surface and the second inner surface, wherein the metallic cladding extends along a partial length of the first tubular and the second tubular.

DETAILED DESCRIPTION

Introduction and Definitions

Figure 1:
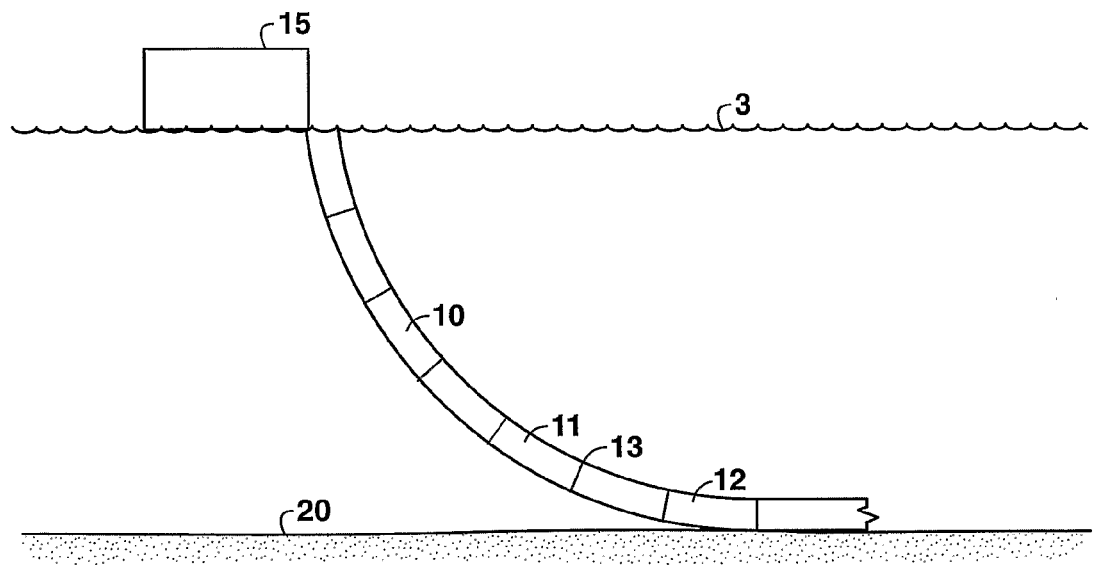
FIG. 1 shows an SCR in use.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are defined below. To the extent a term used in a claim is not defined below, it should be given the broadest definition persons in the pertinent art have given that term as reflected in one or more printed publications (including dictionaries) or issued patents.

The term "tubular" means a fluid conduit having an axial bore, and includes, but is not limited to, a riser, a casing, a production tubing, a liner, and any other type of wellbore tubular known to a person of ordinary skill in the art.

As used herein, the term "bond" refers to any type of connection that is used to connect two metals, and includes, but is not limited to, a weld.

The term "cladding" means a layer of material, and includes, but is not limited to, a tubular sleeve, an arcuate sheath, and a deposited layer of material.

The term "iron based" means a material whose characteristics are determined by its iron content. An exemplary iron based material includes a material having an iron content of at least about 50%.

The term "non-iron based" means a material whose characteristics are determined by an element other than iron. An exemplary non-iron based material includes a material having an iron content of less than about 50%. Another exemplary non-iron based material includes nickel based alloy.

The term "nickel based alloy" means an alloy having at least about 40% nickel content; more preferably, at least about 50% nickel content.

The term "riser" means a pipe that connects a subsea pipeline to a floating surface structure.

The term "crack growth rate" means crack extension per cycle, i.e., da/dN, where "a" is the crack length and "N" is the number of load cycles.

Specific Embodiments of the Tubular Assembly

Various specific embodiments of a tubular assembly and methods of forming or using a tubular assembly are described below, at least some of which are also recited in the claims.

In at least one specific embodiment, a tubular assembly is provided. The tubular assembly includes a first tubular having a first inner surface and a second tubular having a second inner surface. The tubular assembly also includes a metallic bond connecting the first tubular to the second tubular, wherein the metallic bond comprises a material that has a lower crack growth rate than at least that of the first tubular and the second tubular. The tubular assembly further includes a metallic cladding disposed on each of the first inner surface and the second inner surface.

One or more other specific embodiments include a tubular assembly comprising a first iron based tubular having a first non-cladded inner surface and a second iron based tubular having a second non-cladded inner surface, wherein the first tubular is connected to the second tubular using a non-iron based bonding material.

One or more other specific embodiments include a riser assembly comprising a first riser joint having a first inner surface and a second riser having a second inner surface. A non-iron based weld material is used to connect the first tubular to the second tubular, and a non-iron based cladding is disposed on each of the first inner surface and the second inner surface, wherein the cladding extends along a length of the first tubular and the second tubular and wherein the non-iron based weld material and the non-iron based cladding have a lower crack growth rate than the first tubular.

In at least one specific embodiment, a method of connecting a first tubular to a second tubular is provided. The method comprises bonding an end of the first tubular to an end of the second tubular. The method also includes depositing a metallic cladding on a bonding surface of at least one of the first tubular and the second tubular, wherein the bonding surface is substantially smooth.

In one or more of the embodiments described above or elsewhere herein, depositing the metallic cladding comprises welding the metallic cladding to the inner surface.

In one or more of the embodiments described above or elsewhere herein, the metallic cladding is deposited on the bonding surface using a plasma arc welding (PAW) process.

In one or more of the embodiments described above or elsewhere herein, the first tubular is connected to the second tubular at least partially using a gas tungsten arc welding (GTAW) process.

In one or more of the embodiments described above or elsewhere herein, the metallic cladding and the metallic bond comprise substantially the same metallic material.

In one or more of the embodiments described above or elsewhere herein, the metallic material comprises a nickel-based alloy.

In one or more of the embodiments described above or elsewhere herein, the metallic material comprises a nickel-chromium-molybdenum alloy.

In one or more of the embodiments described above or elsewhere herein, the metallic material has a lower crack growth rate than the first tubular.

In one or more of the embodiments described above or elsewhere herein, the metallic bond material has a lower crack growth rate than the first tubular.

In one or more of the embodiments described above or elsewhere herein, the first and second tubulars include a riser.

In one or more of the embodiments described above or elsewhere herein, at least one of the first inner surface and the second inner surface is substantially smooth.

In one or more of the embodiments described above or elsewhere herein, the metallic cladding is corrosion resistant.

In one or more of the embodiments described above or elsewhere herein, the metallic cladding has a length of less than 24 inches.

In one or more of the embodiments described above or elsewhere herein, the metallic cladding comprises a non-iron based material.

In one or more of the embodiments described above or elsewhere herein, a recess is formed on the inner surface of at least one of the first tubular and the second tubular.

In one or more of the embodiments described above or elsewhere herein, an ultrasonic inspection is performed on the connected tubulars.

In one or more of the embodiments described above or elsewhere herein, the first tubular is connected to the second tubular at least partially using a gas metal arc welding (GMAW) process.

In one or more of the embodiments described above or elsewhere herein, the first tubular is connected to the second tubular using a combination a of a gas tungsten arc welding (GTAW) process and a gas metal arc welding (GMAW) process.

In one or more of the embodiments described above or elsewhere herein, an adhesion layer is deposited on at least one of the tubular before connection.

Specific Embodiments in Drawings

Specific embodiments shown in the drawings will now be described.

FIG. 1 shows a typical SCR application wherein the water surface 3 supports a floating structure 15 located above the seabed 20. The SCR 10 is used to connect the floating structure 15 to a seabed pipeline. The SCR 10 is made up of a plurality of riser joints 11, 12 connected together using a metallic bond 13 such as a weld process.

Figure 2:
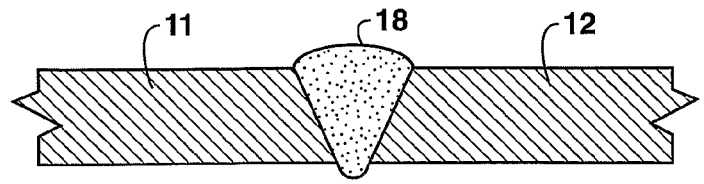
FIG. 2 is an enlarged cross-sectional view of an SCR.

FIG. 2 is an enlarged view of a section of the SCR. In one embodiment, the riser joints 11, 12 are welded together using a weld material 18 that is dissimilar to the material of the riser joints 11, 12. Preferably, one of the dissimilarities is that the weld material 18 has a lower crack growth rate than the iron based material of the riser joints 11, 12. Because fatigue tends to initiate through discontinuities in the weld or stress concentrations caused by the weld, a weld material having a lower crack growth rate may reduce the potential for the cracks to form or propagate, thereby extending the life of the weld.

In another embodiment, the base alloy of the riser material is dissimilar to the base alloy of the weld material. For example, the riser joint may comprise an iron-based material such as steel, while the dissimilar weld material comprises a non-iron based material. In the embodiment shown in FIG. 2, the iron based steel riser joints 11, 12 are bonded together using a nickel based alloy. An exemplary nickel based alloy comprises a nickel-chromium-molybdenum alloy having at least about 18% to about 25%; more preferably, at least about 20% to about 23% chromium. In one embodiment, the weld material 18 comprises a nickel based alloy marketed under the trademark Iconel 625. It has been found that a weld material 18 comprising a nickel based alloy delivers good fatigue performance in non-corrosive environments.

Figure 3:
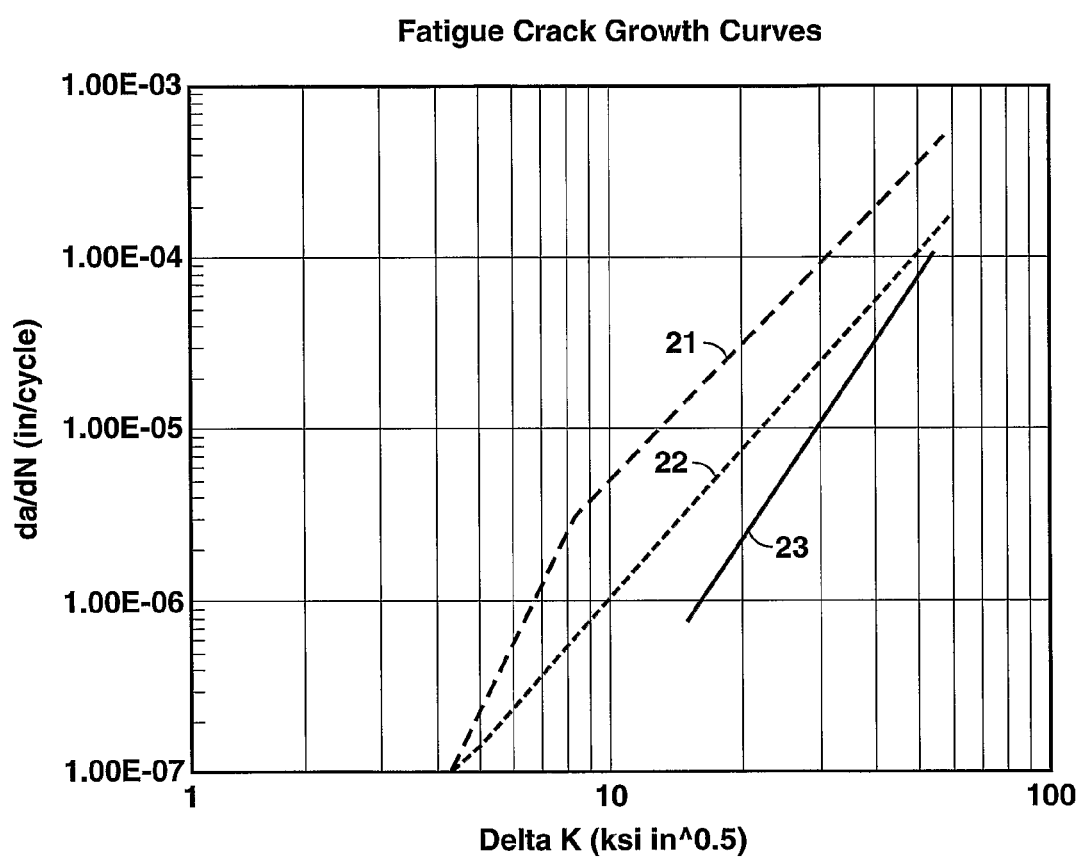
FIG. 3 shows fatigue crack growth curves for Inconel 625 and carbon steel in two different environments.

FIG. 3 shows the fatigue crack growth curves for nickel alloy 625 and carbon steel in two surrounding environments. It can be seen that, for the same stress-intensity-factor range, nickel 625 (23) has a slower crack growth rate than either carbon steel surrounded by sea water (21) or carbon steel surrounded by air (22). In other words, weld material made of nickel alloy 625 has a higher resistance to crack growth than weld material made of carbon steel. As such, use of a nickel based alloy as the weld material may reduce the potential for cracks to form or propagate. In this manner, a nickel based alloy weld material may extend the life of the weld.

In a "sweet" (non-corrosive) environment, two steel risers may be welded together using nickel-chromium alloy as the weld material to increase the fatigue performance of the connection. The two steel risers may be joined using a single "U" groove joint. However, other types of joints, such as a "V" groove, may also be used. Preferably, two different weld methods are used to fill the U groove. First, the gas tungsten arc welding process ("GTAW") is used to perform the initial weld passes such as the root and hot passes. Thereafter, gas metal arc welding ("GMAW") is used to perform the fill and cap passes to complete the weld. GMAW is preferred for the fill and cap passes because it has a higher metal deposit rate than GTAW. Although two different weld processes are preferred, the weld may also be performed using only either the GTAW or the GMAW. It is further contemplated that any suitable welding process known to a person of ordinary skill in the art may be used to connect the risers.

In another embodiment, an "adhesion" layer may optionally be applied to the joining face of at least one of the joining pipes before the pipes are welded together. It is believed that the adhesion layer will aid in the ultrasonic inspection of the welded joint. The adhesion layer is applied by depositing a thin layer of the weld material on the joining face of one of the pipes using GTAW. The adhesion layer should substantially cover from inner diameter edge to the outer diameter edge. When the pipes are held in a vertical position for joining and if only one pipe has an adhesion layer, that pipe is preferably placed on the bottom when it is joined with the other pipe.

Figure 4:
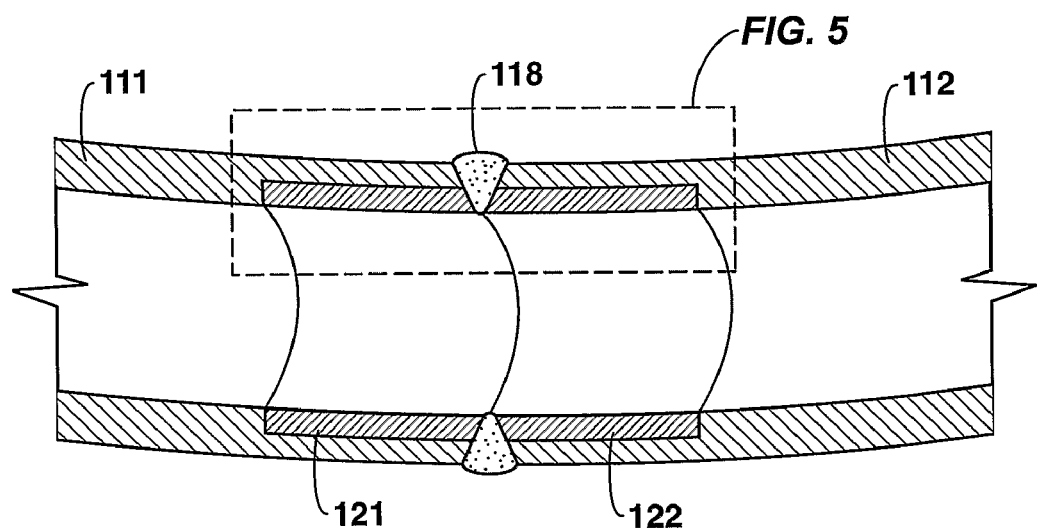
FIG. 4 shows a cross-sectional view of another embodiment of forming a SCR.
Figure 5:
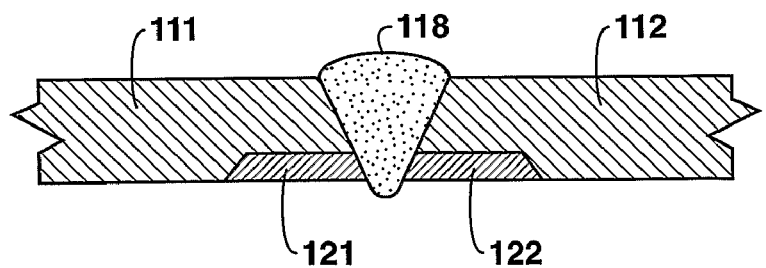
FIG. 5 is an enlarged partial view of the SCR in FIG. 4.

FIG. 4 shows a cross-sectional view of another embodiment of forming a SCR. FIG. 5 is an enlarged view of the cross section of that SCR. As shown, the riser joints 111, 112 are bonded together using a dissimilar weld material 118. Also, the riser joints 111, 112 are provided with a cladding 121, 122 along a partial length of the joints 111, 112 before the riser joints 111, 112 are bonded together. The partial cladding 121, 122 increases the fatigue performance of the weld by preventing cracks from forming near the weld and thereafter propagating toward the weld. In this respect, only a limited section of the riser joints 111, 112 is cladded, as illustrated in FIGS. 4 and 5. Preferably, the cladding 121, 122 has a length of less than about 24 inches; more preferably, less than about 18 inches; and most preferably, less than about 12 inches. A recess 125 may be formed on the inside of each riser joint 111, 112 to accommodate the placement of the claddings 121, 122. Preferably, the cladding 121, 122 comprise a corrosion resistant alloy that has a lower crack growth rate than the material of the riser joints 111, 112. Exemplary alloys include nickel based alloy, and more preferably, a nickel-chromium based alloy. Riser joints 111, 112 having corrosion resistant alloy cladding are most beneficial in "sour" (corrosive) environment applications. The corrosion resistant property of the claddings 121, 122 protects the fatigue prone areas of the SCR from corrosive components flowing through the SCR. As shown in FIGS. 4 and 5, the riser joints 111, 112 may be bonded together using any suitable weld technique known to a person of ordinary skill in the art. In the preferred embodiment, the cladding 121, 122 and the weld material 118 comprise the same metallic material. However, the cladding and the weld material may comprise different metallic materials so long as they each have a lower crack growth rate than the riser joint material.

In another embodiment, the cladding overlay 121, 122 is deposited as a continuous layer using a plasma arc welding process ("PAW"). It is believed the PAW process provides lower penetration of the weld material on the inside surface of the riser joint 111, 112. Because inside surface is less affected by the weld material, a smoother fusion line/boundary is generated between the joints 111, 112 and the claddings 121, 122. The smoother fusion boundary may be referred to as "straight line fusion". During inspection of the riser joints 111, 112, the bonding surface formed has less ultrasound wave attenuation and/or reflection. Thus, a more accurate inspection of the riser joints 111, 112 is achieved. It is contemplated that GTAW may also be used to deposit the cladding overlay.

In yet another embodiment, the cladding may be deposited on a connector for connecting the two riser joints. Each end of the connector may be welded to a riser joint. In this respect, the connector may be made of the same or similar metal as the riser joints. The length of the connector may be about 6 inches to about 10 feet; more preferably, about 12 inches to about 7 feet; and most preferably, about 2 feet to 5 feet. The entire length of the connector inner diameter surface may be cladded with a nickel alloy such as Inconel 625. Using PAW, the cladding is deposited as a continuous layer on the inside surface of the connector by rotating the connector about a horizontally positioned welding torch. After the cladding has been deposited on the connector, the connector is used to connect two separate riser joints. The connector may be welded to the riser joints using a dissimilar weld material as discussed above. In another embodiment, the two riser joints connecting to the connector may be partially cladded to protect against fatigue. In yet another embodiment, the cladding material and the weld material may comprise substantially the same alloy.

Example 1

Example 1 relates to connection of two steel catenary risers using Inconel 625 as the weld material. The steel risers were joined using a single "U" groove joint. To join the riser, gas tungsten arc welding ("GTAW") was used to perform the root and hot passes. Thereafter, gas metal arc welding ("GMAW") was used to perform the fill and cap passes to complete the weld. The connection formed using Inconel 625 has improved fatigue performance over the conventional connection using a material that has similar crack growth characteristics as the riser.

| Base Material | |
|---|---|
| Base Material | API 5L, Grade X52 |
| Diameter | 20" |
| Wall Thickness | 1" |
| Welding Procedure | |
| Welding Process | GTAW/GMAW |
| Tungsten Type and Size (GTAW) | EWTh-2 & ⅛ in. |
| Filler Metal | ERNiCrMo-3 (Inconel 625) |

-continued

| | |
|---|---|
| Preheat Temperature | 21° C. |
| Interpass Temperature (max) | 370° C. |

| Joint design | |
|---|---|
| Groove design | Single U groove |

| Welding Parameters | | |
|---|---|---|
| Pass | Root & Hot Pass | Fill & Cap Passes |
| Welding Process | GTAW | GMAW |
| Welding Polarity | DCEN | DCEP |
| Welding Position | 2G - Horiz. | 2G - Horiz. |
| Filler Metal Diameter | 0.035 in | 0.035 in |
| Current Range (A) | 144-171 | 125-146 |
| Voltage Range (V) | 11-12.1 | 26.9-32 |
| Travel Speed Range (in/min) | 4.5-7.7 | 14.4-18 |
| Shielding Gas | 100% Ar | 90% He, 9.8% Ar, 0.2% $CO_2$ |
| Shielding Gas Flow Rate (CFH) | 35 | 40 |
| Backing Gas | 100% Ar | — |
| Backing Gas Flow Rate (CFH) | 25 | — |

Example 2

Example 2 relates to cladding of an entire length of a connector. The cladding material was Inconel 625 and the connector was a steel pipe. Using PAW, the cladding was deposited as a continuous layer on the inside surface of the connector by rotating the connector about a horizontally positioned welding torch. The connector cladded with Inconel 625 improved fatigue performance over an uncladded connector.

| Base Metal | |
|---|---|
| Base Metal | API 5L X60 Pipe |
| Pipe Diameter | 10" |
| Pipe Thickness | 1" (25.4 mm) |

| Filler Metal | |
|---|---|
| Filler Metal | Alloy 625 |
| AWS Designation | ERNiCrMo-3 |

| Process Parameters | |
|---|---|
| Cladded Surface | Inside diameter of pipe |
| Welding Position | Horizontal |
| Welding Process | PAW |
| Filler Metal Diameter | 0.062" (1.6 mm) |
| Plama Power Arc Source | DCEN |
| Plasma Arc Current | 400-500 A |
| Plasma Arc Voltage | 34-40 V |
| Hot-wire power source | AC |
| Hot-wire current | 165-185 A |
| Hot-wire voltage | 22-26 V |
| Orifice gas and flow rate | 75% He, 25% Ar; 55 ft³/hr (26 L/min) |
| Shielding gas and flow rate | 100% Argon; 40 ft³/hr (19 L/min) |
| Trailing shielding gas and flow rate | 100% Argon; 45 ft³/hr (21 L/min) |
| Standoff distance | 0.8 in (21 mm) |
| Travel Speed | 7.5 in/min (190 mm/min) via pipe rotation |
| Bead Width | 0.7 in (18 mm) |
| Bead thickness | 0.25-0.3 in (6-8 mm) |
| Weave Width | 13 mm |
| Preheat temperature | 250° F. (120° C.) |

We claim:

1. A tubular assembly comprising:
   a first iron-based tubular riser member comprised of a first base metal; and
   a second iron-based tubular riser member comprised of a second base metal, wherein the first base metal and the second base metal are the same metal, and wherein the first tubular is connected to the second tubular using a non-iron based bonding material consisting of nickel-chromium-molybdenum alloy and using a combination of a gas tungsten arc welding process in an initial weld pass and a gas metal arc welding process to complete the connection, the tubular riser assembly forming a catenary shape.

2. The tubular assembly of claim 1 wherein said non-iron based bonding material has a lower crack growth rate than said first iron-based tubular.

3. The tubular assembly of claim 2 wherein said non-iron based bonding material has a lower crack growth rate than said first and second iron-based tubulars.

4. The tubular assembly of claim 1 wherein said bonding material has a higher nickel content than said first or second base metal.

5. The tubular assembly of claim 1, wherein the first iron-based tubular comprises a first inner surface having a length and the second iron-based tubular comprises a second inner surface having a length, wherein a portion of the length of the first inner surface includes a first cladding and a portion of the length of the second inner surface includes a second cladding.

6. The tubular assembly of claim 5, wherein each of the first and second cladding comprise a cladding material having a lower crack growth rate than said first and second iron-based tubulars.

7. A method of connecting a first iron-based tubular riser member comprised of a first base metal, to a second iron-based tubular riser member comprised of a second base metal, wherein the first base metal and the second base metal are the same metal, the method comprising:
   bonding an end of said first iron-based tubular to an end of said second iron-based tubular using a non-iron based bonding material consisting of nickel-chromium-molybdenum alloy and using a combination of a gas tungsten arc welding process in an initial weld pass and a gas metal arc welding process to complete the connection, the tubular riser assembly forming a catenary shape.

8. The method of claim 7 further comprising depositing an adhesion layer on at least one of said first iron-based tubular and said second iron-based tubular.

9. The method of claim 7 wherein said non-iron based bonding material has a lower crack growth rate than said first iron-based tubular.

10. The method of claim 7 further comprising inspecting the connected tubulars.

11. The method of claim 7, further comprising fixedly attaching a first cladding to the first iron-based tubular along a portion of a length of an inner surface of said first iron-based tubular; and
   fixedly attaching a second cladding to the second iron-based tubular along a portion of a length of an inner surface of said second iron-based tubular.

12. The method of claim 11, wherein each of the first and second cladding comprise a cladding material having a lower crack growth rate than said first and second iron-based tubulars.

* * * * *